(12) United States Patent
Hadlich

(10) Patent No.: US 10,423,158 B1
(45) Date of Patent: Sep. 24, 2019

(54) MULTI-CORE PROCESSOR WITH INDEPENDENTLY EXECUTING FLIGHT CONTROL PROGRAMS

(71) Applicant: Amazon Technologies, Inc., Seattle, WA (US)

(72) Inventor: Grant Hadlich, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 322 days.

(21) Appl. No.: 15/586,170

(22) Filed: May 3, 2017

(51) Int. Cl.
*G05D 1/00* (2006.01)
*B64C 39/00* (2006.01)
*G07C 5/08* (2006.01)
*B64C 39/02* (2006.01)

(52) U.S. Cl.
CPC ......... *G05D 1/0077* (2013.01); *B64C 39/024* (2013.01); *G07C 5/0808* (2013.01); *G07C 5/0816* (2013.01); *B64C 2201/024* (2013.01); *B64C 2201/108* (2013.01); *B64C 2201/141* (2013.01)

(58) Field of Classification Search
CPC ................ G05D 1/0077; B64C 39/024; B64C 2201/024; B64C 2201/108; B64C 2201/141; G07C 5/0808; G07C 5/0816
USPC ............................................................ 701/3
See application file for complete search history.

(56) References Cited

U.S. PATENT DOCUMENTS

| | | | |
|---|---|---|---|
| 9,977,432 B1 * | 5/2018 | Cutler | B64C 13/503 |
| 2011/0066305 A1 * | 3/2011 | Lin | B64C 13/503 |
| | | | 701/3 |
| 2015/0073624 A1 * | 3/2015 | Takahashi | B64C 39/024 |
| | | | 701/2 |
| 2018/0002014 A1 * | 1/2018 | McCullough | B64C 29/02 |

OTHER PUBLICATIONS

Yeh, Y.C. (Bob), "Safety Critical Avionics for the 777 Primary Flight Controls System", The Boeing Company, Seattle, WA, IEEE, 2001, pp. 1.C.2-1-1.C.2-11.

* cited by examiner

*Primary Examiner* — Marthe Y Marc-Coleman
(74) *Attorney, Agent, or Firm* — Athorus, PLLC

(57) ABSTRACT

Described is a flight control computer that includes a multi-core processor. Independent flight control programs of the flight control computer are loaded onto and execute from each of the independent processor cores of the multi-core processor. Each flight control program receives an input and independently computes a core output state. The core output states are exchanged among flight control programs operating on the different processor cores and a flight control output for the flight control computer is determined based on the independently generated core output states.

20 Claims, 11 Drawing Sheets

MULTI-CORE PROCESSOR WITH INDEPENDENTLY EXECUTING FLIGHT CONTROL PROGRAMS

BACKGROUND

Many aerial vehicles utilize one or more forms of redundant flight control systems to ensure the safe flight of the aerial vehicle. For example, many commercial airplanes utilize a Fly-By-Wire system that includes triple redundancy for all hardware resources: computing system, electrical power, hydraulic power, and communication. In this system, the flight control system is also redundant and includes three primary flight control computers, each flight control computer including an independent processor that computes flight commands that control the motors and/or adjustable surfaces to aerially navigate the aerial vehicle.

Existing redundant flight control systems often utilize three flight control computers, each of which includes an independent processor, so that the system is robust to a failure of one of the three flight control computers and is still able to safely navigate with a majority of the remaining flight control computers. Some systems have additional redundancy through the addition of additional independent processors. For example, some flight control systems may utilize more than three flight control computers, each having an independent processor. Other systems utilize multiple independent processors within each of the three flight control computers.

While additional independent processors increase the redundancy of flight control systems, they also increase aerial vehicle weight, require more space on the aerial vehicle, and consume more power. While not much a concern for larger aerial vehicles, such as commercial airplanes, for smaller aerial vehicles, such as unmanned aerial vehicles ("UAV") that utilize electrical power, these increases have negative affects by, for example, reducing operational time, and decreasing the amount of additional payload that can be lifted by the aerial vehicle, etc.

DETAILED DESCRIPTION

Figure 1:
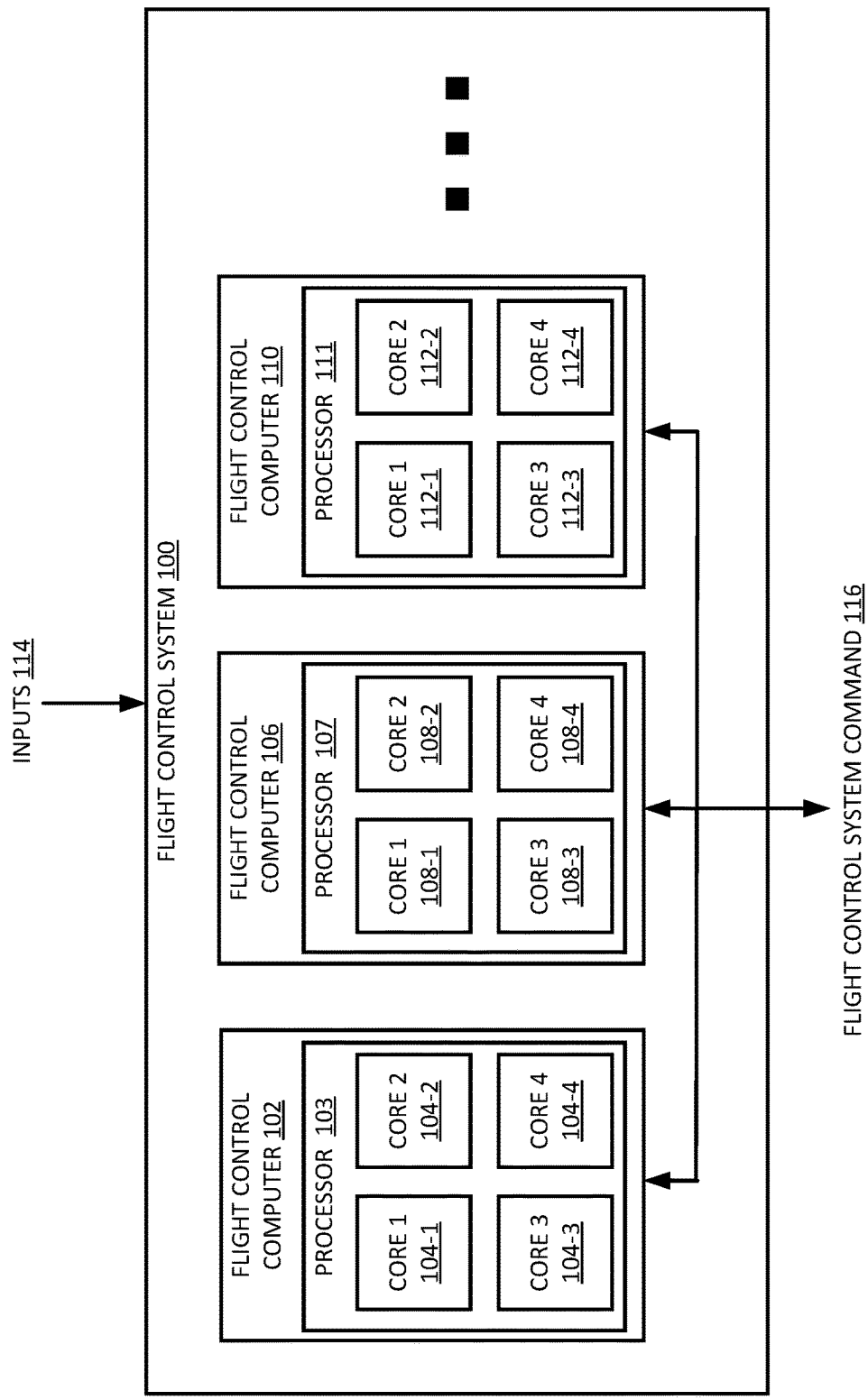
FIG. 1 is a block diagram of a flight control system of an aerial vehicle, in accordance with described implementations.

In addition to providing redundant flight control computers in a flight control system, this disclosure describes redundancy within each flight control computer. As described, each flight control computer of a flight control system includes a multi-core processor and separate processor cores of the multi-core processor are used to provide redundancy within the flight control computer. For example, rather than not having redundancy within the flight control computer or using separate physical processors, which increases weight and power consumption, the disclosed implementations describe a flight control computer with a single, multi-core processor. Loaded onto three or more processor cores of the multi-core processor are independent flight control programs. For example, if the multi-core processor is a quad-core processor, a first flight control program may be loaded onto and operate on a first core of the processor, a second flight control program may be loaded onto and operate on a second core of the processor, and a third flight control program may be loaded onto and operate on a third core of the processor.

Each of the different cores of the multi-core processor and each of the respective flight control programs may operate independent of one another and each may be associated with memory that is dedicated to the respective processor core and available for computation by the respective flight control program.

In operation, each flight control program, operating independently and on different cores of the multi-core processor of the flight control computer, may receive an input, such as a navigation command, a sensor input, etc. Upon receiving the input, each flight control program independently computes a core output state indicating a flight command determined by the respective flight control program that should be executed by one or more motors or other control surfaces of the aerial vehicle.

Upon computing a core output state, the flight control program exchanges the determined core output state with other flight control programs operating on other cores of the flight control computer. Following exchange, each flight control program operating on the different processor cores of the processor of the flight control computer, determines a proposed flight control output based on a comparison of each core output state. Finally, one of the flight control computers operating on one of the processors cores, referred to herein as the master core, provides the determined proposed flight control output as the flight control output from that flight control computer to other flight control computers of a flight control system operating on the aerial vehicle. The flight control output indicating a command to be executed by a motor or other control surface of the aerial vehicle.

By providing additional layers of redundancy within each flight control computer of a redundant flight control system, the overall flight control system is more robust, yet there is no added weight and minimal increase in power consumption by using a single multi-core processor within each flight control computer. This configuration provides a technical improvement over traditional systems that either did not have redundancy within each flight control computer of a flight control system or used separate processors within each flight control computer. The use of separate processors within each flight control system increases the weight of the overall flight control system, requires more space on the aerial vehicle, results in an increased power consumption. For example, the increased weight requires greater fuel consumption. In smaller aerial vehicles, such as UAVs, that are designed to transport low weight packages (e.g., packages weighing less than fifty pounds), the additional weight from additional processors reduces the package weight that can be carried and reduces the flight time due to increased power consumption.

FIG. 1 is a block diagram of a flight control system 100 of an aerial vehicle, in accordance with described implementations. As illustrated, the flight control system may have a first level of redundancy by including three or more flight control computers, such as flight control computers 102, 106, and 110. In other implementations, the flight control system may include additional or fewer flight control computers. As is typical in redundant flight control systems, the flight control computers 102, 106, 110 of the flight control system 100 each receive inputs 114. The input 114 may be from a variety of sources. For example, the input 114 may be a navigation command received from a remote control, a navigation command received from the aerial vehicle controller as part of autonomous aerial flight, a sensor input from one or more sensors that measure forces (e.g., wind) acting on the aerial vehicle, etc.

Different from existing redundant flight control systems, in the disclosed implementations, each flight control computer 102, 106, 110 of the flight control system 100 includes a multi-core processor and each of the multiple processor cores of each respective multi-core processor may independently execute a version of a flight control program, each of which are used to process the inputs and produce commands for aerial navigation of the aerial vehicle in response to the input. For example, the first flight control computer 102 includes a multi-core process 103 that includes four processor cores 104-1, 104-2, 104-3, and 104-4. The second flight control computer 106 also include a multi-core processor 107 that includes four processor cores 108-1, 108-2, 108-3, and 108-4. The third flight control computer 110 also includes a multi-core processor 111 that includes four processor cores 112-1, 112-2, 112-3, and 112-4.

While the described examples illustrate multi-core processors with four processor cores, the implementations described herein are equally applicable to multi-core processors with fewer processor cores (e.g., three processor cores) or additional processor cores (e.g., seven processor cores).

In the described implementations, flight control programs may be loaded onto and operate independently on different processor cores of a multi-core processor within a flight control computer. For example, a first flight control program may be loaded onto and execute from the first processor core 104-1 of the processor 103 of the flight control computer 102, a second flight control program may be loaded onto and execute from the second processor core 104-1 of the processor 103 of the flight control computer 102, and a third flight control program may be loaded onto and execute from the third processor core 104-1 of the processor 103 of the flight control computer 102, As described in more detail below, each flight control program receives the input 114, independently processes the input, and independently determines a core output state representative of a command determined by the respective flight control program that should be executed by a motor or other control surface in response to the received input.

Within each flight control computer, such as the first flight control computer 102, each flight control program operating on different processor cores of the processor 103 exchange core output state information and, based on the shared core output states, a flight control output is determined for the flight control computer.

A collective determination of a flight control output for a flight control computer may be performed for each flight control computer 102, 106, and 110 of the flight control system 100. As each flight control computer determines a flight control output, the flight control computers 102, 106, 110 exchange the determined flight control outputs. Finally, based on the flight control outputs determined for each flight control computer, a single flight control command 116 for the flight control system 100 is determined and sent from the flight control system 100 to another component of the aerial vehicle, such as a motor controller, or a control surface (e.g., tail fin, rudder, aileron, wing) controller that converts the flight control command into a mechanical output by the respective component to control aerial navigation of the aerial vehicle.

Figure 2:
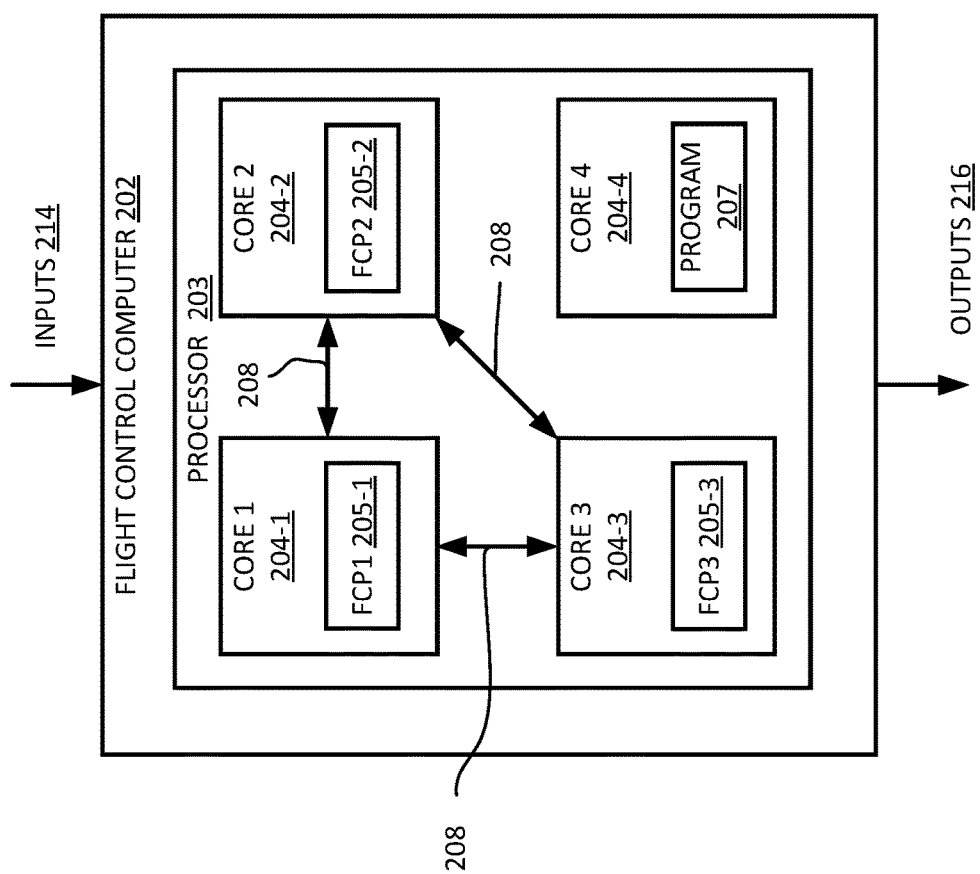
FIG. 2 is a block diagram of a multi-core processor of a flight control computer, in accordance with described implementations.

FIG. 2 is a block diagram of a multi-core processor 203 of a flight control computer 202 of a flight control system, such as the flight control system 100 illustrated in FIG. 1, in accordance with described implementations. In the illustrated example, the flight control computer 202 includes a multi-core processor 203 with four processor cores 204-1, 204-2, 204-3, and 204-4. Likewise, in this example, the flight control computer 202 includes three flight control programs 205-1, 205-2, and 205-3, operating independently on different processor cores 204-1, 204-2, and 204-3. The flight control programs 205 may the same programs and/or one two or more of the flight control programs 205 may be different. As discussed further below, each flight control program individually calculates the state of the vehicle and/or the command to be executed, and also calculates the health of other processor cores of the processor. A processor core may become corrupt, also referred to herein as unreliable or unhealthy, due to cosmic rays, faulty hardware, or other external forces encountered during aerial vehicle navigation.

In addition to computing the core output state by each flight control program operating on different processor cores of the processor of the flight control computer, each flight control program also calculates the health of itself, the health of the processor core on which it is executing, and the health of other flight control programs operating on other cores of the multi-core processor. Through this process, a defective flight control program operating on one of the processor cores can be identified and prevented from sending bad information from the flight control computer.

As illustrated by the arrows 208, once each flight control program 205 has independently computed the core output state, the flight control programs exchange core output states so that each processor core has all core output states determined by flight control programs operating on the different cores of the processor of the flight control system.

In the example illustrated in FIG. 2, only three of the processor cores 204-1, 204-2, and 204-3 are executing a flight control program. Any additional processor cores of the processor 203, such as the fourth processor core 204-4, may be used by the aerial vehicle control system to provide any other function. For example, the fourth core 204-4 of the processor 203, may be used by the aerial vehicle control system (discussed below) to process navigation, determine user preferences for item delivery, etc.

In this example, as each of the three flight control programs 205 receive the core output state determined by the other flight control programs operating on the cores of the multi-core processor 203, the respective flight control program determines a proposed flight control output 216. As discussed further below, the proposed flight control output 216 may be an average or median of each core output state. However, if one of the core output states varies beyond a tolerance range with respect to the other core output states received, it may be determined that one of the cores and/or the flight control program executing on the respective core is unhealthy and the received data, or lack thereof, is to be discarded when determining the proposed flight control output. Finally, once a proposed flight control output is determined, the proposed flight control output is provided by the flight control computer to other flight control computers within the flight control system.

Through use of multiple flight control programs operating independently on different processor cores of the same multi-core processor within a flight control computer, triple redundancy is realized and the output provided from the flight control computer to other flight control computers is more reliable. Likewise, the flight control computer is robust with respect to software failures because one of the cores and/or flight control program may become inoperable or unreliable and the flight control computer can still reach a majority opinion from the other two flight control computers.

Figure 3:
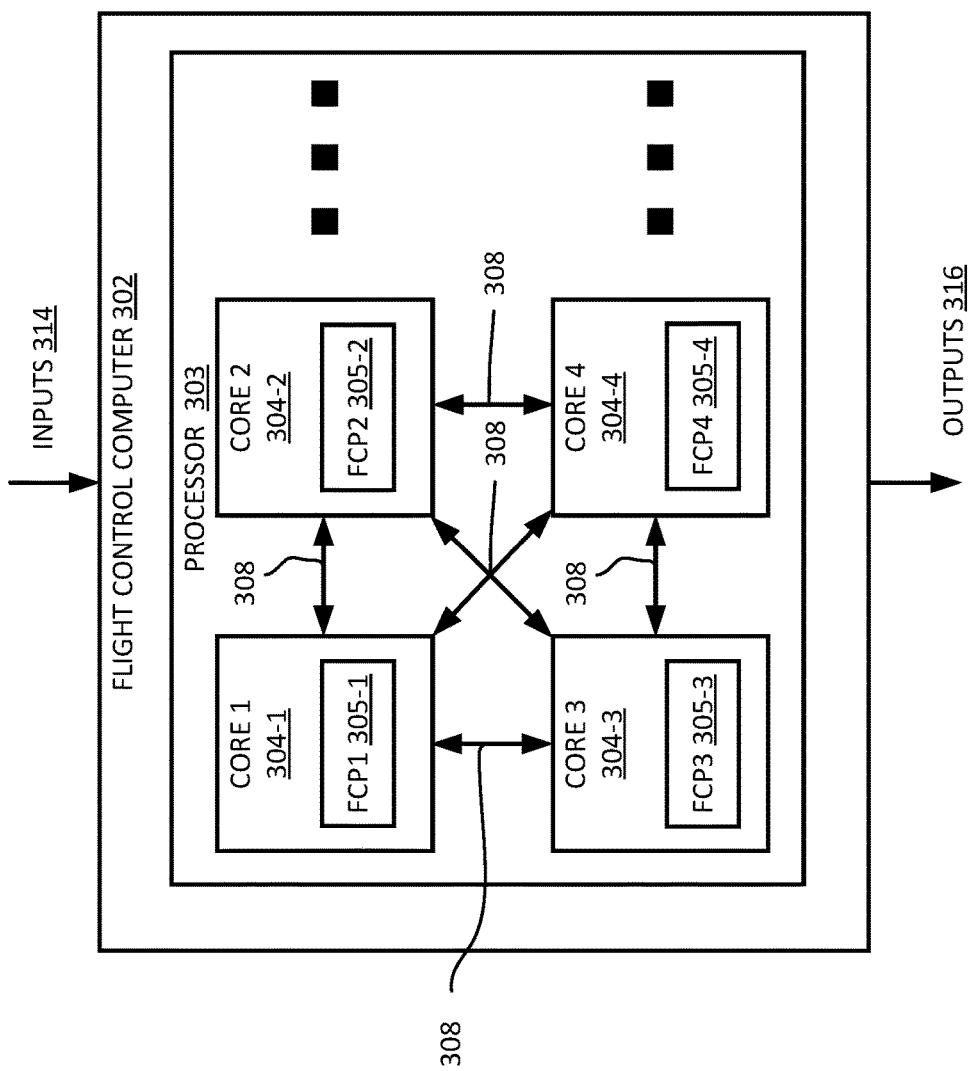
FIG. 3 is a block diagram of a multi-core processor of a flight control computer, in accordance with described implementations.

FIG. 3 is a block diagram of another multi-core processor 303 of a flight control computer 302, in accordance with described implementations. Similar to the flight control computer 202 discussed above with respect to FIG. 2, the flight control computer 302 of FIG. 3 also includes a multi-core processor 303 that includes, in this example, at least four processor cores 304-1, 304-2, 304-3, 304-4. However, in comparison to FIG. 2, the illustration of FIG. 3 presents that each of the four processor cores include corresponding flight control programs 305-1, 305-2, 305-3, and 305-4, respectively.

Similar to the example discussed with respect to FIG. 2, each flight control program operating on the different cores of the processor 303 of the flight control computer 302 receive the input 314 and independently compute a core output state based on the received input. In addition, each flight control program exchanges the determined core output state with each of the other flight control programs 305 operating on different cores of the processor 303 of the flight control computer 302, as illustrated by the arrows 308. Likewise, each flight control program determines a proposed flight control output based on the core output states computed by each flight control program operating on the different cores. Finally, a proposed flight control output is selected and sent to other flight control computers as the flight control output 316 from the flight control computer 302.

As will be appreciated, a larger number of cores may be included on the multi-core processor and additional flight control programs may be loaded and executed independently on respective additional processor cores. For each additional flight control program operating on an independent processor core of the processor of the flight control computer, the greater the redundancy at the flight control computer level. For example, with three flight control programs, the flight control computer is robust to one failure, still having two flight control programs to determine a majority opinion.

With fourth flight control programs, the flight control computer is robust to two failures, still having two flight control programs to determine a majority opinion.

Figure 4:
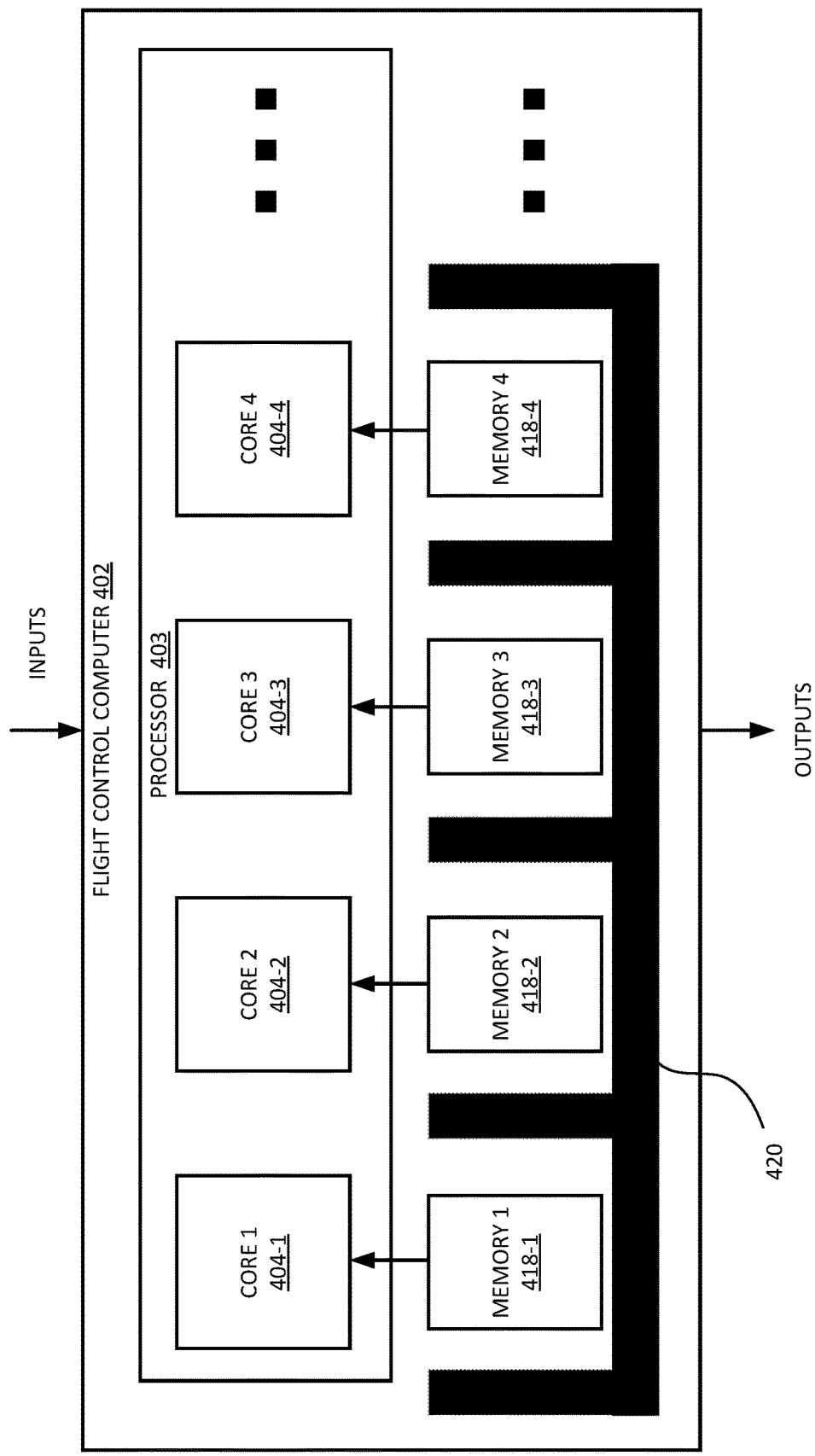
FIG. 4 is a block diagram of a multi-core processor of a flight control computer, in accordance with described implementations.

FIG. 4 is a block diagram of a multi-core processor 403 of a flight control computer 402, in accordance with described implementations. Similar to the flight control computer 202 discussed above with respect to FIG. 2 or the flight control computer 302 discussed above with respect to FIG. 3, the flight control computer 402 of FIG. 4 includes a multi-core processor 403 that includes, in this example, at least four processor cores 404-1, 404-2, 404-3, 404-4. In addition, FIG. 4 illustrates that associated with each processor core is a dedicated memory, such as a dedicated processor memory, also known as cache memory. In other implementations, the dedicated memory may be memory that is separate from the processor, such as a separate cache memory, random access memory (RAM), etc. In the illustrated implementation, the memory 418 associated with each processor core is separated by a partition 420 so that only the processor core with which the memory is associated can access the memory. By partitioning the memory, a memory error will only affect one core of the multi-core processor.

In the illustrated example, the first processor core 404-1 is associated with a first memory 418-1, the second processor core 404-2 is associated with a second memory 418-2, the third processor core 404-3 is associated with a third memory 418-3, and the fourth processor core 404-4 is associated with a fourth memory 418.4. As discussed above, the processor 403 of the flight control computer 402 may include additional or fewer processor cores. Likewise, for each core, a segment of memory may be associated with the core and partitioned to only be accessible by that core.

The allocated memory may be used by the flight control program operating on the respective core to process received inputs and determine core output states. Likewise, the memory may be used to store health information regarding the core, the flight control program, and/or information (e.g., core output states, health) received from other cores of the processor 403 of the flight control computer.

While the illustration of FIG. 4 shows the memory as separate from the processor 403, in other implementations the memory may be integrated into the processor 403 and internally partitioned and associated with respective cores 404 of the processor 403.

Figure 5:
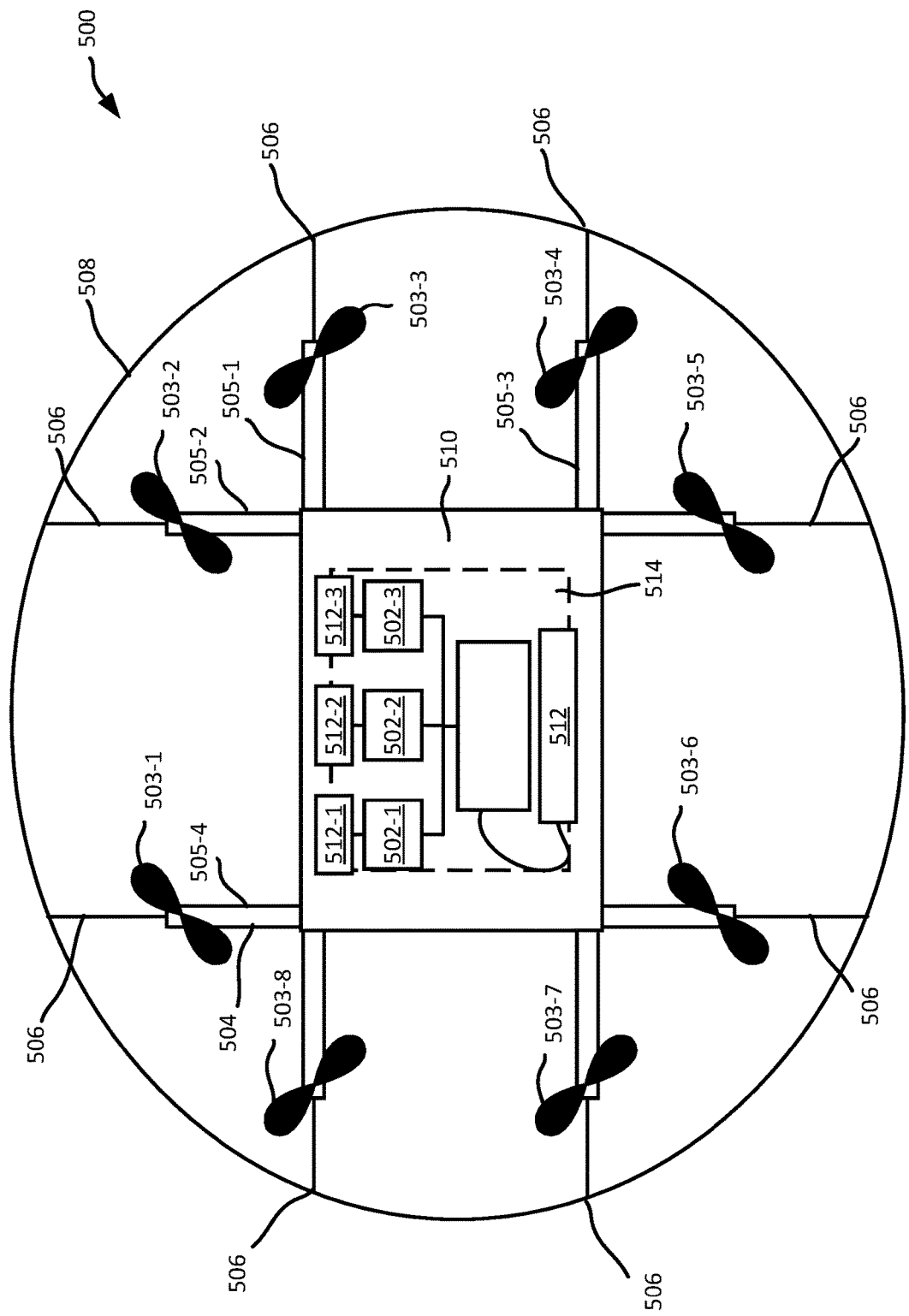
FIG. 5 is a block diagram of an example unmanned aerial vehicle, in accordance with described implementations.

FIG. 5 illustrates a block diagram of a top-down view of an aerial vehicle, in this example a UAV 500, according to an implementation. As illustrated, the UAV 500 includes eight propellers 503-1, 503-2, 503-3, 503-4, 503-5, 503-6, 503-7, 503-8 spaced about the frame 504 of the UAV. The propellers 503 may be any form of propeller (e.g., graphite, carbon fiber) and of a size sufficient to lift the UAV 500 and any inventory engaged by the UAV 500 so that the UAV 500 can navigate through the air to deliver the item(s) to a delivery location. While this example includes eight propellers, in other implementations, more or fewer propellers may be utilized. Likewise, in some implementations, the propellers may be positioned at different locations on the UAV 500. In addition, alternative methods of propulsion may be utilized as "motors" in implementations described herein. For example, fans, jets, turbojets, turbo fans, jet engines, internal combustion engines, and the like may be used (either with propellers or other devices) to propel the UAV.

The frame 504 of the UAV 500 may likewise be of any suitable material, such as graphite, carbon fiber and/or aluminum. In this example, the frame 504 of the UAV 500 includes four rigid members 505-1, 505-2, 505-3, 505-4, or beams arranged in a hash pattern with the rigid members intersecting and joined at approximately perpendicular angles. In this example, rigid members 505-1 and 505-3 are arranged substantially parallel to one another and are approximately the same length. Rigid members 505-2 and 505-4 are arranged substantially parallel to one another, yet perpendicular to rigid members 505-1 and 505-3. Rigid members 505-2 and 505-4 are approximately the same length. In some embodiments, all of the rigid members 505 may be of approximately the same length, while in other implementations, some or all of the rigid members may be of different lengths. Likewise, the spacing and/or orientation between the two sets of rigid members may be approximately the same or different.

While the implementation illustrated in FIG. 5 includes four rigid members 505 that are joined to form the frame 504, in other implementations, there may be fewer or more components to the frame 504. For example, rather than four rigid members, in other implementations, the frame 504 of the UAV 500 may be configured to include six rigid members. In such an example, two of the rigid members 505-2, 505-4 may be positioned parallel to one another. Rigid members 505-1, 505-3 and two additional rigid members on either side of rigid members 505-1, 505-3 may all be positioned parallel to one another and perpendicular to rigid members 505-5, 505-4. With additional rigid members, additional cavities with rigid members on all four sides may be formed by the frame 504. As discussed further below, a cavity within the frame 504 may be configured to include an inventory engagement mechanism for the engagement, transport and delivery of item(s) and/or containers that contain item(s).

In some implementations, the UAV may be configured to reduce aerodynamic resistance. For example, an aerodynamic housing may be included on the UAV that encloses the UAV control system 510, one or more of the rigid members 505, the frame 504 and/or other components of the UAV 500. The housing may be made of any suitable material(s) such as graphite, carbon fiber, aluminum, titanium, magnesium, fiberglass, etc. Likewise, in some implementations, the location and/or the shape of the inventory (e.g., item or container) may be aerodynamically designed. For example, in some implementations, the inventory engagement mechanism 514 may be configured such that when the inventory is engaged it is enclosed within the frame and/or housing of the UAV 500 so that no additional drag is created during transport of the inventory by the UAV 500. In other implementations, the inventory may be shaped to reduce drag and provide a more aerodynamic design of the UAV and the inventory. For example, if the inventory is a container and a portion of the container extends below the UAV when engaged, the exposed portion of the container may have a curved shape.

The propellers 503 and corresponding propeller motors are positioned at both ends of each rigid member 505. The propeller motors may be any form of motor capable of generating enough speed with the propellers to lift the UAV 500 and any engaged inventory thereby enabling aerial transport of the inventory.

Extending outward from each rigid member is a support arm 506 that is connected to a safety barrier 508. In this example, the safety barrier is positioned around and attached to the UAV 500 in such a manner that the motors and propellers 503 are within the perimeter of the safety barrier 508. The safety barrier may be plastic, rubber, etc. Likewise, depending on the length of the support arms 506 and/or the length, number or positioning of the rigid members 505, the safety barrier may be round, oval, or any other shape.

Mounted to the frame 504 is the UAV control system 510. In this example, the UAV control system 510 is mounted in the middle and on top of the frame 504. The UAV control system 510, as discussed in further detail below with respect to FIG. 11, controls the operation, routing, navigation, communication and the inventory engagement mechanism of the UAV 500.

Likewise, the UAV 500 includes one or more power modules 512. In this example, the UAV 500 includes a power module 512 that are removably mounted to the frame 504 and configured to provide power to components of the UAV control system and/or other components of the aerial vehicle. In addition, the independent flight control computers 502-1, 502-2, and 502-3, which are part of the UAV control system 510 but illustrated herein for discussion purposes, may also each be coupled to independent power supplies 512-1, 512-2, and 512-3, respectively. By individually powering each flight control computer, a power failure of one power supply will not affect the power provided to the other flight control computers 502. For example, if power supply 512-1 fails it will render flight control computer 502-1 inoperable but will not impact the operation of flight control computers 502-2 or 502-3.

The power module(s) for the UAV may be in the form of battery power, solar power, gas power, super capacitor, fuel cell, alternative power generation source, or a combination thereof. For example, the power modules 512 may each be Lithium Polymer (lipo) batteries.

In some implementations, one or more of the power modules may be configured such that it can be autonomously removed and/or replaced with another power module while the UAV is landed. For example, when the UAV lands at a secure delivery location, relay location and/or materials handling facility, the UAV may engage with a charging member at the location that will recharge the power module. In some implementations, a container may include a power module and when the engagement mechanism of the UAV engages with the container, the power module of the container may provide power to the UAV. For example, when an item is being delivered to a delivery location, the power module included in the container may be utilized to power the UAV, rather than and/or in addition to the power modules 512 of the UAV 500. When the container is disengaged, the power provided by the container is removed and the UAV 500 operates using power from the UAV power modules 512.

As mentioned above, the UAV 500 also includes an inventory engagement mechanism 514. The inventory engagement mechanism may be configured to engage and disengage items and/or containers that hold items. In this example, the inventory engagement mechanism 514 is positioned within a cavity of the frame 504 that is formed by the intersections of the rigid members 505. In this example, the inventory engagement mechanism is positioned beneath the UAV control system 510. In implementations with additional rigid members, the UAV may include additional inventory engagement mechanisms and/or the inventory engagement mechanism 514 may be positioned in a different cavity within the frame 504. The inventory engagement mechanism may be of any size sufficient to securely engage and disengage containers that contain inventory. In other implementations, the engagement mechanism may operate as the container, containing the inventory item(s) to be delivered. The inventory engagement mechanism communicates with (via wired or wireless communication) and is controlled by the UAV control system 510.

While the implementations of the UAV discussed herein utilize propellers to achieve and maintain flight, in other implementations, the UAV may be configured in other manners. For example, the UAV may include fixed wings and/or a combination of both propellers and fixed wings. For example, the UAV may utilize one or more propellers to enable takeoff and landing and a fixed wing configuration or a combination wing and propeller configuration to sustain flight while the UAV is airborne.

Figure 6:
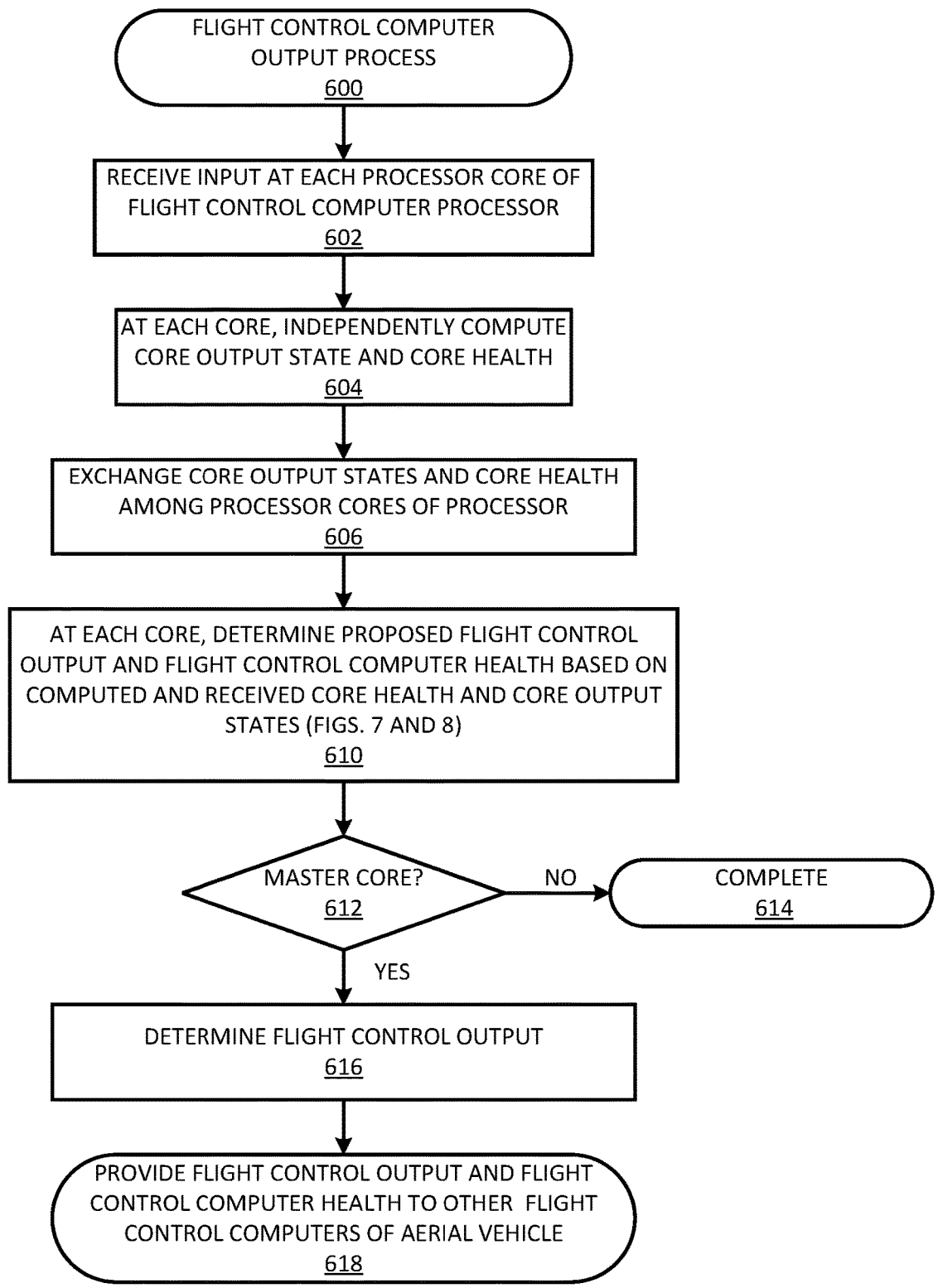
FIG. 6 illustrates a flow diagram of an example flight control output process, in accordance with described implementations.

FIG. 6 illustrates a flow diagram of an example flight control computer output process 600, in accordance with described implementations. The example process begins upon receipt of an input at each processor core of a flight control computer processors, as in 602. As discussed above, to provide redundancy at the flight control computer level, distinct flight control programs are loaded onto and execute on different processor cores of a multi-core processor of the flight control computer. Each of those flight control programs receive an input to the flight control computer. In some implementations, each independent flight control program may be synchronized. In other implementations, the flight control programs may not be synchronized. Likewise, in some implementations, the input may be the same for each processor core and respective flight control program. In other implementations, the inputs may vary slightly due to the asynchronous nature of the programs. For example, if the input is being received from the inertial navigation system of the aerial vehicle, the inputs to each flight control program executing on different processor cores of the processor of the flight control computer may vary.

Upon receiving the input, at each core, the respective flight control program independently processes the received input and computes a core output state based at least in part on the received input and a core health, as in 604. The core output state represents a command determined by the flight control program to be executed by a motor or other control surface in response to the input. Determination of the command may be based on a combination of the received input and the current state of the vehicle (e.g., altitude, speed, flight mode, etc.). Techniques for determining an output state by a flight control program are known in the art and further discussion is not provided herein. However, because each processor core and executing flight control program operate independently, a core output state is independently produced for each processor core. Core health may be computed based on, for example, any self-reported fault, memory corruption indicator, built-in test failure, etc. In some instances, in the absence of a memory corruption, built-in test failure, or other warning indicator, the core health may be determined to be normal, or healthy.

As the flight control program computes the core output state, the computed core output state is provided to the other flight control programs executing on the other cores of the flight control processor. As such, each core output state computed by a flight control program executing on a processor core of a multi-core processor of the flight control computer is exchanged with other flight control programs of the flight control computer so that all flight control programs of the flight control computer have the computed core output state from each other flight control program, as in 606. In some implementations in which the flight control computers are asynchronous, there may be a delay upon completion of computation of the core output state and receipt of all other computed core output states. This delay, however, may be minimal as the cycle time may be approximately 100 Hertz.

Once a flight control program has computed its own core output state and received the core output states computed by each of the other flight control programs executing on other processor cores of the multi-core processor of the flight control computer, each flight control program determines, based at least in part on one or more of the core output states, a proposed flight control output and a flight control computer health, as in 610. Computation of the proposed flight control output is discussed in further detail with respect to FIG. 7 and flight control computer health is discussed in further detail with respect to FIG. 8.

At each core, upon computing a proposed flight control output, a determination is made as to whether the processor core and corresponding flight control program are designated as the master core for the flight control computer, as in 612. Any processor core and flight control program may be designated as the master. Likewise, the designation of master may vary between cycles, may be fixed to a specific processor core, etc. If it is determined that the processor core and corresponding flight control program are not designated as the master, the process 600 completes for that processor core and corresponding flight control program, as in 614. However, if it is determined that the processor core and corresponding flight control program are designated as the master, the flight control program and processor core determine from the proposed flight control output a flight control output for the flight control computer, as in 616. In some implementations, the flight control output may be the proposed flight control output determined by the processor core. In other implementations, the flight control output may be an average of the proposed flight control outputs, a randomly selected one of the proposed flight control outputs, etc.

Finally, the flight control program and processor core provide the determined flight control output for the flight control computer and the flight control computer health to other flight control computers of the flight control system, as in 618. For example, each flight control computer may be communicating via a wired or wireless communication bus and configured to exchange flight control outputs and health information.

By independently computing on different cores of a multi-core processor of a flight control computer a core output state, exchanging the computed core output states across cores, and then each computing a proposed flight control output, redundancy at the flight control computer level is provided on a single processor. As such, there is no additional weight added for the redundancy, less power consumption is required compared to using independent processors, etc.

Figure 7:
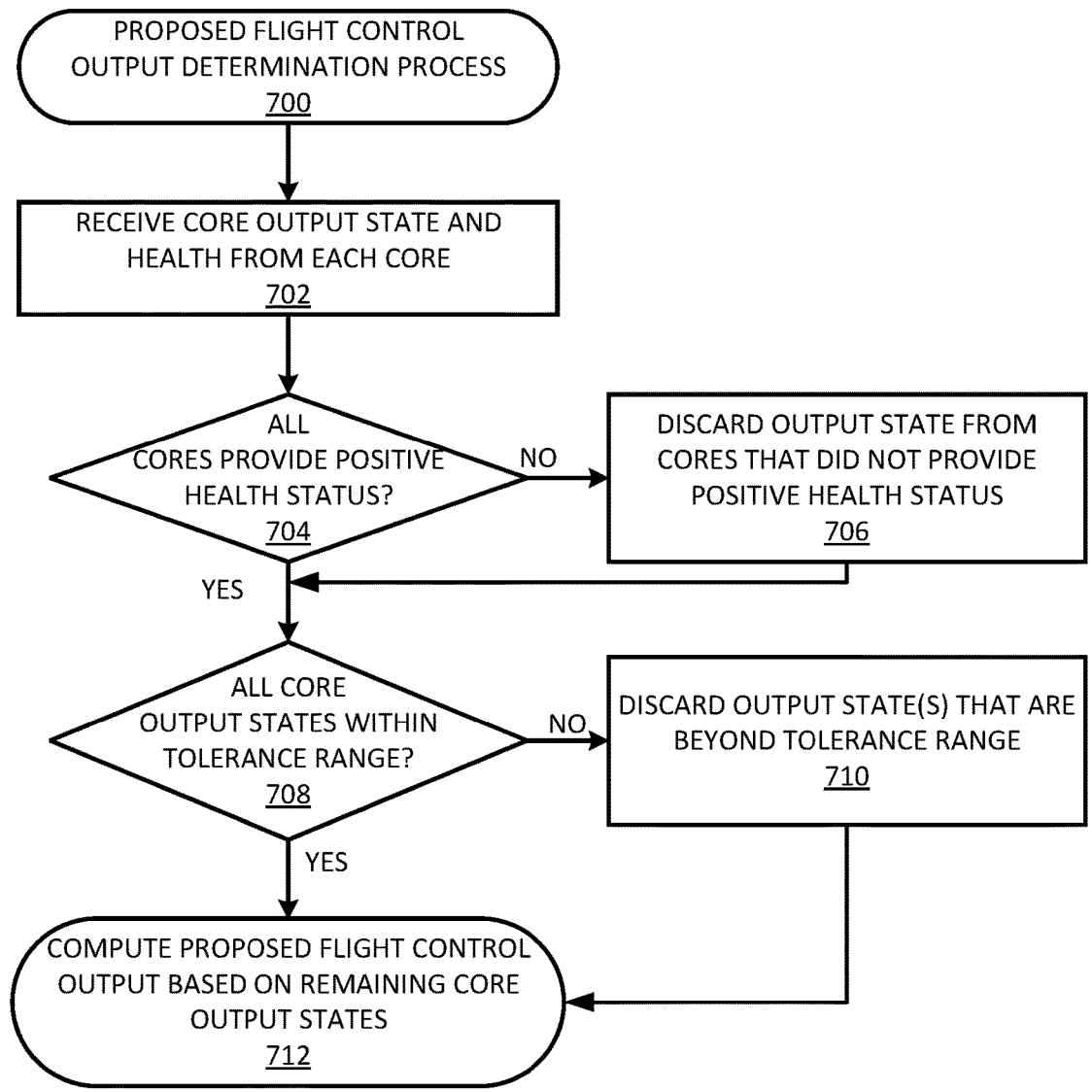
FIG. 7 illustrates a flow diagram of an example proposed flight control output determination process, in accordance with described implementations.

FIG. 7 illustrates a flow diagram of an example proposed flight control output determination process 700, in accordance with described implementations. As discussed above with respect to FIG. 6, each flight control program executing independently on each core of a multi-core processor of a flight control computer may perform the example process 700 to determine a proposed flight control output for that flight control computer.

The example process 700 begins upon receipt of all core output states and respective health information from each of the other flight control programs executing on other processor cores of the multi-core processor of the flight control computer, as in 702. In some implementations, there may be a defined wait period during which the core output states are expected to be received. If a core output state is not received during that wait period, it may be determined that the flight control program and corresponding core processor are unhealthy and/or have failed.

Upon receipt of the core output state from each processor core, a determination is made as to whether each core and respective flight control program has provided a positive health status indication, as in 704. If one or more of the processor cores and/or corresponding flight control programs have provided an indication that the health of the core or executing flight control program is unreliable or unhealthy, the core output state received from that processor core may be discarded, as in 706.

In addition, after discarding any core output states received from a processor core that has indicated an unhealthy or unreliable state and/or after determination that all processor cores have provided a positive health state, a determination is made as to whether all of the received core output states are within a tolerance range of the other received core output states, as in 708. Because the input data received by each of the flight control programs operating on the respective cores is the same or similar, the computed flight control states should all be within a tolerance range of one another. The tolerance range may vary for different flight control computers, different types of input, etc. In one implementation, the tolerance range is five percent, meaning that each received core output state must be within five percent of another received core output state to be considered within a tolerance range. In other implementations, the tolerance range may be one standard deviation of the group of received core output states. In other implementations, the tolerance range may be three standard deviations.

For any core output states determined to be beyond the tolerance range, the core output state is discarded, as in 710. Likewise, the processor core and flight control program from which the core output state was received may be indicated as unreliable.

After discarding any core output states beyond the tolerance range, or if it is determined at decision block 708 that all considered core output states are within the tolerance range, a proposed flight control output is computed based on the remaining core output states, as in 712. Computation of a proposed output state based on the remaining core output states may be done according to a variety of manners. For example, a mean, median, or mode of the remaining core output states may be computed and used as the proposed flight control output. In other implementations, one of the remaining core output states may be randomly selected as the proposed flight control output. In still other examples, the smallest or largest core output state may be selected as the proposed flight control output.

By eliminating any core output states from unhealthy cores and eliminating any core output states that are beyond a threshold range, a proposed flight control output for the flight control computer may be determined that is based on built in redundancy and the accuracy of which is based on the independent computation from multiple flight control programs operating independently on different processor cores of the multi-core processor of the flight control computer.

Figure 8:
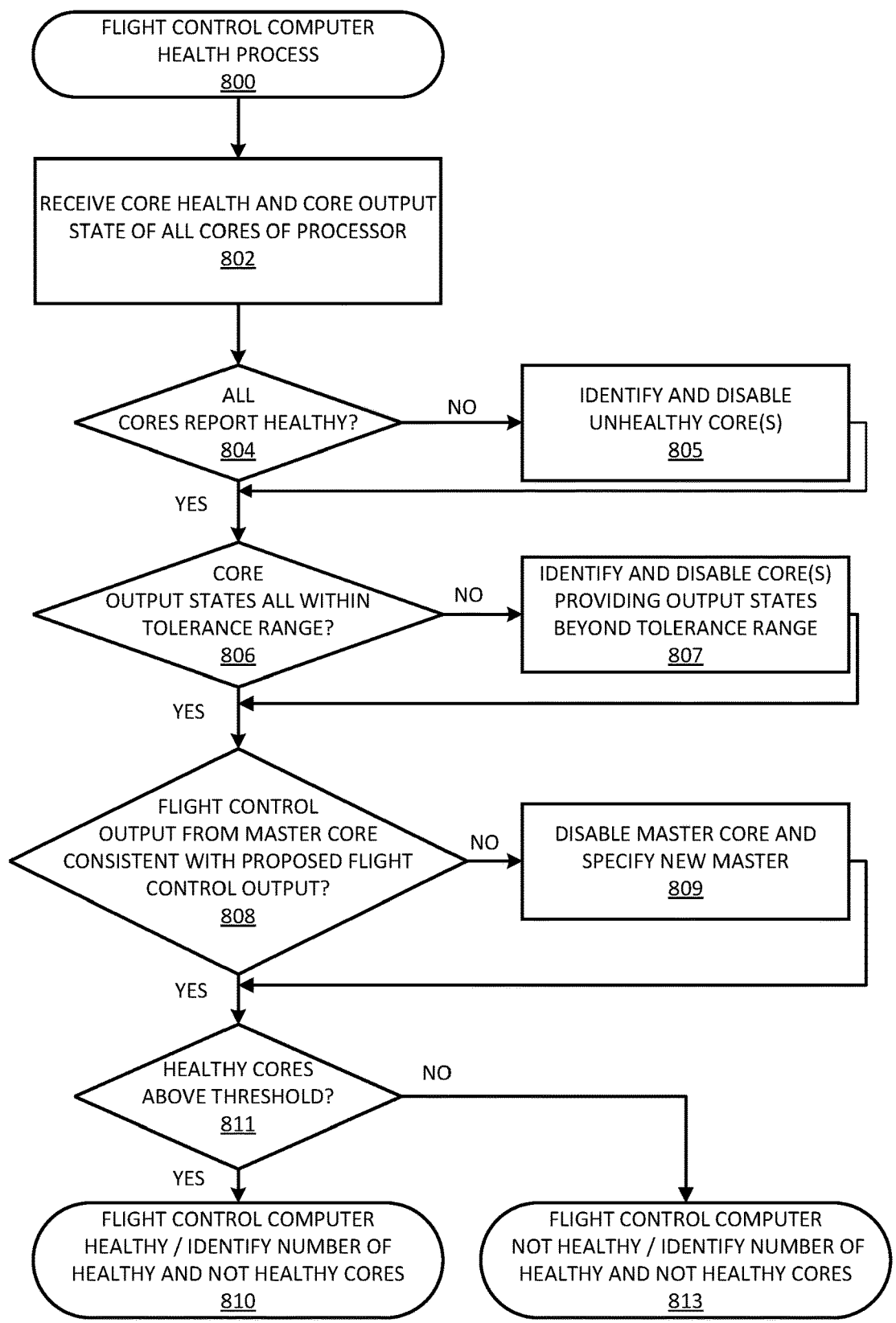
FIG. 8 illustrates a flow diagram of an example flight control computer health monitoring process, in accordance with described implementations.

FIG. 8 illustrates a flow diagram of an example flight control computer health monitoring process 800, in accordance with described implementations. The example process 800 begins upon receipt of the core health and core output state from each other flight control program operating on different cores of the processor of the flight control computer, as in 802. As will be appreciated, the example process 800 may be performed independently by each flight control program of the flight control computer.

Based on the received health status indicators, a determination is made as to whether all flight control programs operating on the processor cores have provided a positive or healthy status indication, as in 804. If it is determined that one or more cores has provided an unhealthy or unreliable health status, the flight control program and corresponding processor core are determined and disabled, as in 805.

After disabling any processor cores that provided an unhealthy state, or if it is determined that all processor cores provided a healthy or reliable state indication, a determination is made as to whether all received core output states are within a tolerance range of the other received core output states, as in 806. As discussed above, with respect to decision block 708 (FIG. 7), because the input data received by each of the flight control programs operating on the respective cores is the same or similar, the computed flight control states should all be within a tolerance range of one another. The tolerance range may vary for different flight control computers, different types of input, etc. In one implementation, the tolerance range is five percent, meaning that each received core output state must be within five percent of another received core output state to be considered within a tolerance range. In other implementations, the tolerance range may be one standard deviation of the group of received core output states. In other implementations, the tolerance range may be three standard deviations.

If any of the core output states are beyond the tolerance range, the processor core and corresponding flight control program that provided the core output state that is beyond the tolerance range is determined and disabled, as in 807.

Finally, in addition to disabling any cores that provided core output states that are beyond the tolerance range, or if it is determined at decision block 806 that all core output states are within the tolerance range, a determination is made as to whether the flight control output provided by the processor core and corresponding flight control program designated as the master is consistent with the proposed flight control output determined by the flight control program executing the example process 800.

If it is determined that the flight control output provided by the processor core designated as the master does not correspond with the proposed flight control output, the processor core and corresponding flight control program may be disabled as unhealthy and a new processor core may be selected as the master, as in 809.

In some implementations, each of the steps of identifying and disabling a processor core may include verification with other processor cores also executing the example process 800 before a processor core is disabled. For example, if a first processor core determines that the flight control output provided by the second processor core, which was designated as the master, does not correspond with the proposed flight control output determined by the first processor core, prior to disabling the second flight control program and selecting a new master, the first flight control program may verify with the third flight control program that the third flight control program also determined that the flight control output sent by the second flight control program does not correspond to the proposed flight control output computed by the third flight control program. By verifying with other flight control programs executing on different cores of the multi-core processor of the flight control computer, a consensus or majority decision may be made before a processor core and corresponding flight control program are designated as unhealthy and disabled.

Returning to FIG. 8, after disabling the processor core designated as the master (block 809) or if it is determined that the flight control output corresponds with the proposed flight control output, a determination is made as to whether the number of healthy cores and corresponding flight control pogroms is above a threshold, as in 811. The threshold may vary depending on the total number of processor cores and corresponding flight control programs that are executing on the processor of the flight control computer. For example, if there are three processor cores with executing flight control programs, the threshold may require that at least two cores be designated as healthy. In other implementations, the threshold may be different.

If it is determined that the number of processor cores and executing flight control programs is above the threshold, it is determined that the flight control computer is healthy and the number of determined healthy cores and/or unhealthy cores may be provided to other flight control computers of the flight control system, as in 810. Alternatively, if it is determined that the number of healthy cores is not above the threshold, it may be determined that the flight control computer is not healthy and the number of healthy cores and/or not healthy cores may be provided to other flight control computers of the flight control system, as in 813.

Figure 9:
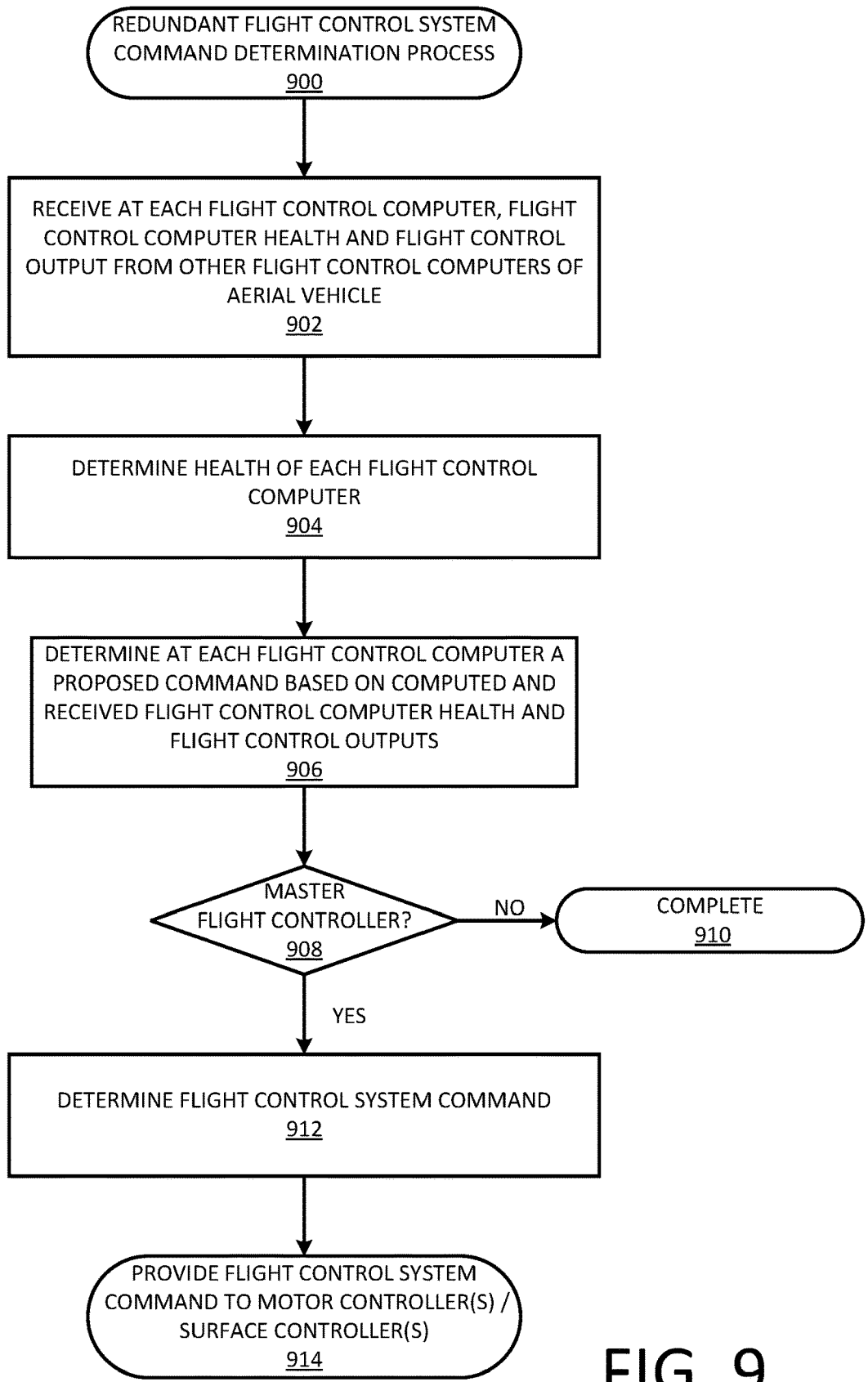
FIG. 9 illustrates a flow diagram of an example redundant flight control system command determination process, in accordance with described implementations.

FIG. 9 illustrates a flow diagram of an example redundant flight control system command determination process 900, in accordance with described implementations. The example process 900 begins upon receipt by each flight control computer of a flight control system, the flight control computer health and flight control outputs from other flight control computers of the flight control system, as in 902. As discussed above, when the redundant flight control programs of a flight control computer produce a flight control output for that flight control computer, the flight control output is sent from the flight control computer to other flight control computers of the flight control system of the aircraft.

Once each of the health information and flight control outputs from the other flight control computers have been received, each flight control computer independently determines the health of each flight control computer, as in 904. The health of the other flight control computers may be determined based on the health status provided by the other flight control computers, the number of reliable cores identified by the other flight control computers, the number of unreliable cores identified by the other flight control computers and/or based on a comparison of the flight control output received from each of the flight control computers.

In addition, each flight control computer determines, based on the received flight control outputs and the flight control output generated by that flight control computer, a proposed flight control command, as in 906. Various approaches may be used to determine a proposed flight control command. Computation of a proposed flight control command may be done according to a variety of manners. For example, a mean, median, or mode of all proposed flight control outputs may be computed and used as the proposed flight control command. In other implementations, one of the proposed flight control outputs may be randomly selected as the proposed flight control output. In still other examples, the smallest or largest proposed flight control output may be selected as the proposed flight control command.

Upon determination of a proposed flight control command, each flight control computer determines whether it is designated as a master flight control computer, as in 908. If the flight control computer is not designated as the master flight control computer, the process 900 completes for that flight control computer, as in 910. If it is determined for the flight control computer that the flight control computer is designated as the master flight control computer, the flight control computer determines a flight control system command, as in 912. The flight control system command is a command that is sent by the flight control system to one or more motor controllers or surface controllers that is used to navigate the aerial vehicle. The flight control system command may be the proposed flight control system command determined by that flight control computer. Those skilled in the art of redundant flight control systems understand the process for selecting a flight control system command from a flight control system that utilizes multiple flight control computers and thus will not be described in further detail herein.

Finally, the flight control computer of the flight control system that is designated as the master sends the flight control system command to one or more motor controllers and/or surface controllers to control aerial navigation of the aerial vehicle.

Figure 10:
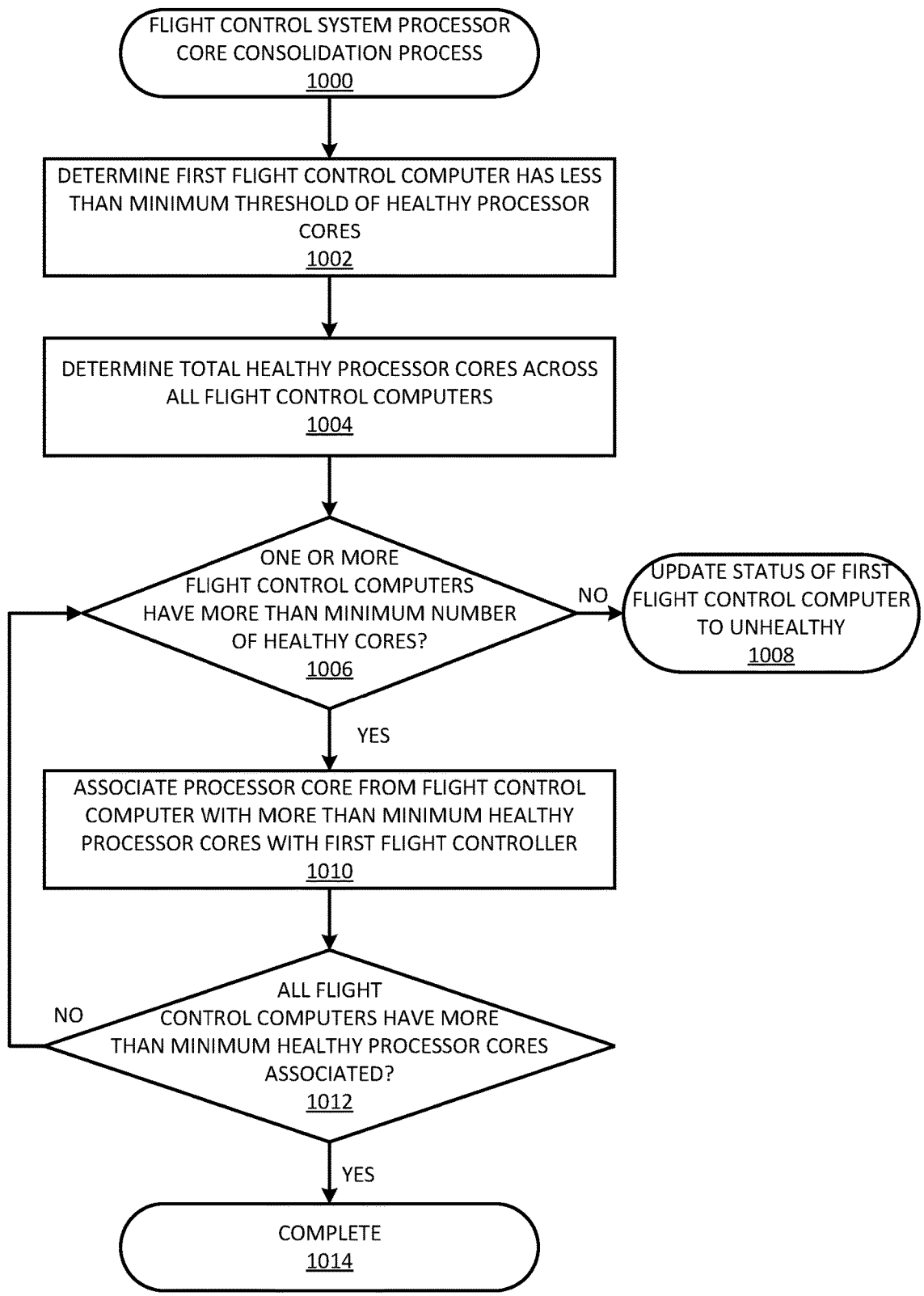
FIG. 10 illustrates a flow diagram of an example flight control system processor core consolidation process, in accordance with described implementations.

FIG. 10 illustrates a flow diagram of an example flight control system processor core consolidation process 1000, in accordance with described implementations. The example process 1000 may be performed when one or more processor cores of one or more flight control computers of a flight control system fails or becomes unreliable.

The example process 1000 begins by determining that a first flight control computer has less than a minimum threshold number of healthy processor cores executing respective flight control programs, as in 1002. The minimum threshold may be any defined level of redundancy. For example, the minimum threshold may specify that at least two processor cores with respective flight control programs must be operational for each flight control computer. In other implementations, the minimum threshold may be higher or lower.

The example process then determines the total number of healthy or reliable processor cores within the flight control system, among all flight control computers, as in 1004. Based on the number of healthy flight control processors, a determination may be made as to whether one or more of the flight control computers has more than the minimum number of flight control processor cores that are healthy and operating in a reliable manner, as in 1006. If it is determined that there are no flight control computers with more processor cores than the minimum required number, the status of the first flight control computer is updated to indicate that the flight control computer is in an unhealthy state, or is not reliable, as in 1008.

However, if it is determined that there is one or more flight control computers that have more than the minimum number of reliable flight control processor cores, a processor core from one of those other flight control computers is reassigned and associated with the first flight control computer, as in 1010. In such an implementation, when the core output state from the flight control program executing on the reassigned processor core is provided to other flight control programs executing on the reliable processor cores of the multi-core processor of the first flight control computer. In such an implementation, the provided core output state is used in the example processes discussed above to determine the proposed flight control output for the first flight control computer.

Returning to FIG. 10, a determination is then made as to whether, after the processor core reassignment, all the flight control computers have at least the minimum number of required healthy processor cores associated therewith, as in 1012. If it is determined that all the flight control computers of the flight control system have at least the minimum number of associated processors cores, the example process completes, as in 1014. If it is determined that one or more of the flight control computers of the flight control system does not have at least the minimum number of processor cores associated therewith, the example process 1000 returns to block 1006 and continues.

Figure 11:
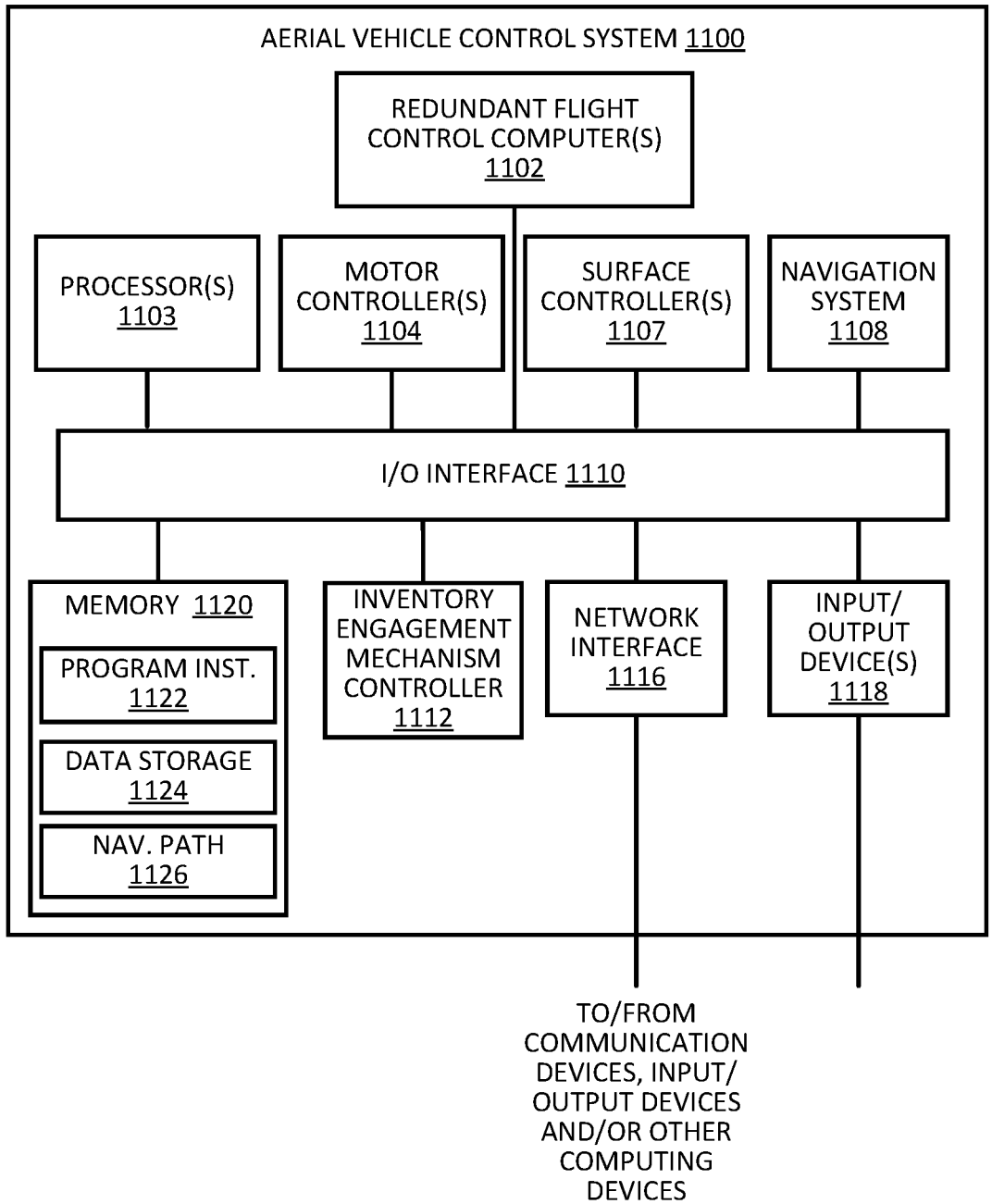
FIG. 11 illustrates an example aerial vehicle control system, in accordance with described implementations.

FIG. 11 is a block diagram illustrating an example aerial vehicle control system 1100, according to disclosed implementations. In various examples, the block diagram may be illustrative of one or more aspects of the aerial vehicle control system 1100 that may be used to implement the various systems and methods discussed above. In the illustrated implementation, the aerial vehicle control system 1100 includes one or more redundant flight control computers 1102, such as those discussed above, and one or more processors 1103, coupled to a non-transitory computer readable storage medium 1120 via an input/output (I/O) interface 1110. The aerial vehicle control system 1100 may also include a motor controller 1104, such as an electronic speed control (ESC), a surface controller 1107, and/or a navigation system 1108. The aerial vehicle control system 1100 further includes an inventory engagement mechanism controller 1112, a network interface 1116, and one or more input/output devices 1118

In various implementations, the aerial vehicle control system 1100 may be a uniprocessor system including one processor 1103, or a multiprocessor system including several processors 1103 (e.g., two, four, eight, or another suitable number). The processor(s) 1103 may be any suitable processor capable of executing instructions. For example, in various implementations, the processor(s) 1103 may be general-purpose or embedded processors implementing any of a variety of instruction set architectures (ISAs), such as the x86, PowerPC, ARM, SPARC, or MIPS ISAs, or any other suitable ISA. In multiprocessor systems, each processor(s) 1103 may commonly, but not necessarily, implement the same ISA.

The non-transitory computer readable storage medium 1120 may be configured to store executable instructions, data, navigation paths and/or data items accessible by the processor(s) 1103. In various implementations, the non-transitory computer readable storage medium 1120 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1120 as program instructions 1122, data storage 1124 and navigation path data 1126, respectively. In other implementations, program instructions, data and/or navigation paths may be received, sent or stored upon different types of computer-accessible media, such as non-transitory media, or on similar media separate from the non-transitory computer readable storage medium 1120 or the aerial vehicle control system 1100. Generally speaking, a non-transitory, computer readable storage medium may include storage media or memory media such as magnetic or optical media, e.g., disk or CD/DVD-ROM, coupled to the aerial vehicle control system 1100 via the I/O interface 1110. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1116.

In one implementation, the I/O interface 1110 may be configured to coordinate I/O traffic between the redundant flight control computer(s) 1102, processor(s) 1103, the non-transitory computer readable storage medium 1120, and any peripheral devices, the network interface 1110 or other peripheral interfaces, such as input/output devices 1118. In some implementations, the I/O interface 1110 may perform any necessary protocol, timing or other data transformations to convert data signals from one component (e.g., non-transitory computer readable storage medium 1120) into a format suitable for use by another component (e.g., processor(s) 1103). In some implementations, the I/O interface 1110 may include support for devices attached through various types of peripheral buses, such as a variant of the Peripheral Component Interconnect (PCI) bus standard or the Universal Serial Bus (USB) standard, for example. In some implementations, the function of the I/O interface 1110 may be split into two or more separate components, such as a north bridge and a south bridge, for example. Also, in some implementations, some or all of the functionality of the I/O interface 1110, such as an interface to the non-transitory computer readable storage medium 1120, may be incorporated directly into the processor(s) 1103.

The motor controller 1104 communicates with the navigation system 1108 and adjusts the power of each motor to guide the aerial vehicle along a determined navigation path. The navigation system 1108 may include a GPS or other similar system than can be used to navigate the aerial vehicle. The inventory engagement mechanism controller 1112 communicates with the motor(s) (e.g., a servo motor) used to engage and/or disengage inventory. For example, when the aerial vehicle is positioned over a level surface at a delivery location, the inventory engagement mechanism controller 1112 may provide an instruction to a motor that controls the inventory engagement mechanism to release the inventory.

The network interface 1116 may be configured to allow data to be exchanged between the aerial vehicle control system 1100, other devices attached to a network, such as other computer systems, and/or with aerial vehicle control systems of other aerial vehicles. For example, the network interface 1116 may enable wireless communication between numerous aerial vehicles that are transporting inventory to various delivery destinations. In various implementations, the network interface 1116 may support communication via wireless general data networks, such as a Wi-Fi network. For example, the network interface 1116 may support communication via telecommunications networks such as cellular communication networks, satellite networks, and the like.

Input/output devices 1118 may, in some implementations, include one or more displays, image capture devices, thermal sensors, infrared sensors, time of flight sensors, accelerometers, pressure sensors, weather sensors, etc. Multiple input/output devices 1118 may be present and controlled by the aerial vehicle control system 1100. One or more of these sensors may be utilized to assist in the landing as well as avoid obstacles during delivery and/or engagement of inventory. For example, utilizing a location signal from the GPS receiver and one or more IR sensors, the aerial vehicle may safely land on a location designated by the user. The IR sensors may be used to provide real-time data to assist the aerial vehicle in avoiding moving/movable obstacles.

As shown in FIG. 11, the memory 1120 may include program instructions 1122 which may be configured to implement the example processes and/or sub-processes described above. The data storage 1124 may include various data stores for maintaining data items that may be provided for determining navigation paths, retrieving inventory, landing, identifying a level surface for disengaging inventory, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 1100 is merely illustrative and is not intended to limit the scope of the present disclosure. The aerial vehicle control system 1100 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

The data and/or computer executable instructions, programs, firmware, software and the like (also referred to herein as "computer executable" components) described herein may be stored on a computer-readable medium that is within or accessible by computers or computer components such as the computing resources and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, while this disclosure describes implementations with respect to aerial vehicles and determining flight commands for aerial vehicles, the disclosed implementations are equally applicable to other forms of vehicles including, but not limited to, ground based vehicles and/or water based vehicles. For example, the implementations disclosed herein may be used as part of a ground based navigation system to determine ground based navigation commands for controlling motors of a ground based vehicle.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 6-10, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly," "similar," or "substantially" as used herein, represent a value, amount, or characteristic close to the stated value, amount, or characteristic that still performs a desired function or achieves a desired result. For example, the terms "about," "approximately," "generally," "nearly," "similar," or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An unmanned aerial vehicle ("UAV") redundant flight control apparatus, comprising:
    a first flight control computer including a first processor;
    a second flight control computer including a second processor;
    a third flight control computer including a third processor;
    the first processor including at least three processing cores;
    a first flight control program corresponding to the first flight control computer operating on a first processing core of the first processor, the first flight control program configured to at least:
        receive an input; and
        compute, based at least in part on the input, a first core output state;
    a second flight control program corresponding to the first flight control computer operating on a second processing core of the first processor, the second flight control program operating independent of the first flight control program and configured to at least:
        receive the input; and
        compute, based at least in part on the input, a second core output state;
    a third flight control program corresponding to the first flight control computer operating on a third processing core of the first processor, the third flight control program operating independent of the first flight control program and the second flight control program and configured to at least:
        receive the input; and
        compute, based at least in part on the input, a third core output state;
    the first flight control computer configured to at least, determine from each of the first core output state, the second core output state, and the third core output state, a first flight control output;
    the second flight control computer configured to at least, determine, independent of the first flight control computer, a second flight control output;
    the third flight control computer configured to at least, determine, independent of the first flight control computer and the second flight control computer, a third flight control output;
    the UAV redundant flight control apparatus configured to at least:
        determine, based at least in part on one or more of the first flight control output, the second flight control output, and the third flight control output, a flight control command; and
        send the flight control command to a motor controller to control an aerial navigation of the UAV.

2. The UAV redundant flight control apparatus of claim 1, wherein the first flight control computer further includes:
    a first memory allocated to the first processing core;
    a second memory allocated to the second processing core; and
    a third memory allocated to the third processing core.

3. The UAV redundant flight control apparatus of claim 2, wherein the first flight control computer further includes:
    a partition separating each of the first memory, the second memory, and the third memory.

4. The UAV redundant flight control apparatus of claim 1, wherein the first flight control computer is further configured to determine, based at least in part on the first core output state, the second core output state, and the third core output state, a respective health of each of the first processing core, the second processing core, and the third processing core.

5. The UAV redundant flight control apparatus of claim 1, wherein the first flight control computer is further configured to at least:
    determine that the first core output state is beyond a tolerance range with respect to the second core output state and the third core output state; and
    determine the flight control command based on the second core output state and the third core output state, without considering the first core output state.

6. A flight control computer of an aerial vehicle, comprising:
    a multi-core processor including at least a first processing core, a second processing core, and a third processing core;
    a first flight control program operating on the first processing core of the multi-core processor, the first flight control program configured to at least:
        receive a first input; and
        compute, based at least in part on the first input, a first core output state;
    a second flight control program operating on the second processing core of the multi-core processor, the second flight control program operating independent of the first flight control program and configured to at least:
        receive a second input; and
        compute, based at least in part on the second input, a second core output state;
    a third flight control program operating on the third processing core of the multi-core processor, the third flight control program operating independent of the first flight control program and the second flight control program and configured to at least:
        receive a third input; and
        compute, based at least in part on the third input, a third core output state;
    the flight control computer configured to at least:

determine from each of the first core output state, the second core output state, and the third core output state, a first flight control output; and provide the first flight control output to at least one other flight control computer of the aerial vehicle.

7. The flight control computer of claim 6, further comprising:
a first memory communicatively coupled with the first processing core;
a second memory communicatively coupled with the second processing core; and
a third memory communicatively coupled with the third processing core.

8. The flight control computer of claim 7, further comprising:
a partition separating each of the first memory, the second memory, and the third memory.

9. The flight control computer of claim 6, wherein at least two of the first flight control program, the second flight control program, and the third flight control program are different.

10. The flight control computer of claim 6, wherein the flight control computer is further configured to at least:
receive from at least one other flight control computer of the aerial vehicle a second flight control output; and
determine a flight control command based at least in part on the first flight control output and the second flight control output; and
provide the flight control command to at least one motor controller of the aerial vehicle.

11. The flight control computer of claim 6, wherein the first flight control program is further configured to at least:
determine a health of the first processing core; and
provide a health indicator representative of the health of the first processing core.

12. The flight control computer of claim 6, wherein the first flight control program is further configured to at least:
receive from the second flight control program the second core output state;
receive from the third flight control program the third core output state; and
determine, based at least in part on one or more of the first core output state, the second core output state, and the third core output state, a proposed flight control output.

13. The flight control computer of claim 12, wherein the first flight control program is further configured to at least:
determine that the first flight control output provided by the flight control computer does not correspond to the proposed flight control output;
determine a processing core that provided the first flight control output; and
disable the first processing core.

14. The flight control computer of claim 6, further comprising:
a fourth flight control program operating on a fourth processing core of the multi-core processor, the fourth flight control program operating independent of the first flight control program, the second flight control program, and the third flight control program, and configured to at least:
receive a fourth input; and
compute, based at least in part on the fourth input, a fourth core output state; and
wherein, the flight control computer is further configured to at least determine from each of the first core output state, the second core output state, the third core output state, and the fourth core output state, a proposed flight control output.

15. A computer-implemented method for redundant flight control on an aerial vehicle, comprising:
receiving a first input at a first flight control program operating on a first processing core of a multi-core processor of a flight control computer of the aerial vehicle;
processing the first input using the first flight control program to determine a first core output state;
receiving a second input at a second flight control program operating on a second processing core of the multi-core processor of the flight control computer of the aerial vehicle;
processing the second input using the second flight control program to determine a second core output state;
receiving a third input at a third flight control program operating on a third processing core of the multi-core processor of the flight control computer of the aerial vehicle;
processing the third input using the third flight control program to determine a third core output state;
determining, based at least in part on one or more of the first core output state, the second core output state, or the third core output state, a flight control output; and
sending the flight control output to at least one component of the aerial vehicle.

16. The computer-implemented method of claim 15, further comprising:
receiving at the first flight control program the second core output state and the third core output state; and
determining with the first flight control program and based at least in part on one or more of the first core output state, the second core output state, or the third core output state, a first proposed flight control output.

17. The computer-implemented method of claim 16, further comprising:
receiving at the second flight control program the first core output state and the third core output state;
receiving at the third flight control program the first core output state and the second core output state;
determining with the second flight control program and based at least in part on one or more of the first core output state, the second core output state, or the third core output state, a second proposed flight control output; and
determining with the third flight control program and based at least in part on one or more of the first core output state, the second core output state, or the third core output state, a third proposed flight control output.

18. The computer-implemented method of claim 17, wherein determining the flight control output is based at least in part on one or more of the first proposed flight control output, the second proposed flight control output, or the third proposed flight control output.

19. The computer-implemented method of claim 18, further comprising:
wherein the first flight control program determines the first core output state independent of the second flight control program and independent of the third flight control program.

20. The computer-implemented method of claim 15, wherein sending the flight control output is sent by the first flight control program.

* * * * *